United States Patent [19]

Irrgeher et al.

[11] Patent Number: 5,072,952
[45] Date of Patent: Dec. 17, 1991

[54] SEALING ELEMENT

[75] Inventors: Fritz Irrgeher, Leverkusen-Hitdorf; Werner Frank, Bergisch Gladbach, both of Fed. Rep. of Germany

[73] Assignee: Irbit Research & Consulting AG, Fribourg, Switzerland

[21] Appl. No.: 595,627

[22] Filed: Oct. 5, 1990

Related U.S. Application Data

[63] Continuation of Ser. No. 293,516, Jan. 4, 1989, abandoned.

[30] Foreign Application Priority Data

Jan. 4, 1988 [DE] Fed. Rep. of Germany ... 8800023[U]

[51] Int. Cl.$^5$ .............................................. F16J 15/10
[52] U.S. Cl. ........................................ 277/229; 49/498
[58] Field of Search ............... 277/226, 227, 228, 229; 49/477, 475, 498

[56] References Cited

U.S. PATENT DOCUMENTS

| | | | |
|---|---|---|---|
| 2,686,747 | 8/1954 | Wurtz et al. | 277/228 X |
| 3,110,065 | 11/1963 | Dennis | 49/498 X |
| 3,355,181 | 11/1967 | Olson | 49/498 X |
| 3,542,375 | 11/1970 | Renwick | 277/229 |
| 3,775,204 | 11/1973 | Thompson et al. | 277/228 X |
| 4,156,533 | 5/1979 | Close et al. | 277/229 |
| 4,330,136 | 5/1982 | Henson | 277/229 X |
| 4,401,716 | 8/1983 | Tschudin-Mahrer . | |
| 4,564,550 | 1/1986 | Tschudin-Mahrer . | |
| 4,621,731 | 11/1986 | Tschudin-Mahrer . | |
| 4,790,544 | 12/1988 | Kemp | 277/226 X |
| 4,977,018 | 12/1990 | Irregeher et al. | 277/228 |

FOREIGN PATENT DOCUMENTS

| | | | |
|---|---|---|---|
| 272382 | 6/1988 | European Pat. Off. | 277/228 |
| 1267905 | 6/1961 | France | 277/228 |
| 1325883 | 12/1963 | France . | |
| 128566 | 1/1983 | Japan | 277/228 |
| 1567199 | 5/1980 | United Kingdom | 277/228 |

*Primary Examiner*—William A. Cuchlinski, Jr.
*Assistant Examiner*—Scott W. Cummings
*Attorney, Agent, or Firm*—Martin A. Farber

[57] ABSTRACT

The present invention refers to a sealing element, particularly for the sealing of joints, having a foam element which is elastically expandable with delay as a result of impregnation and a substantially air-tight cover. In order to obtain improved tightness of the seal while retaining the advantageous ability of use of such a sealing element, the cover forms an open region within which the foam element is exposed.

15 Claims, 2 Drawing Sheets

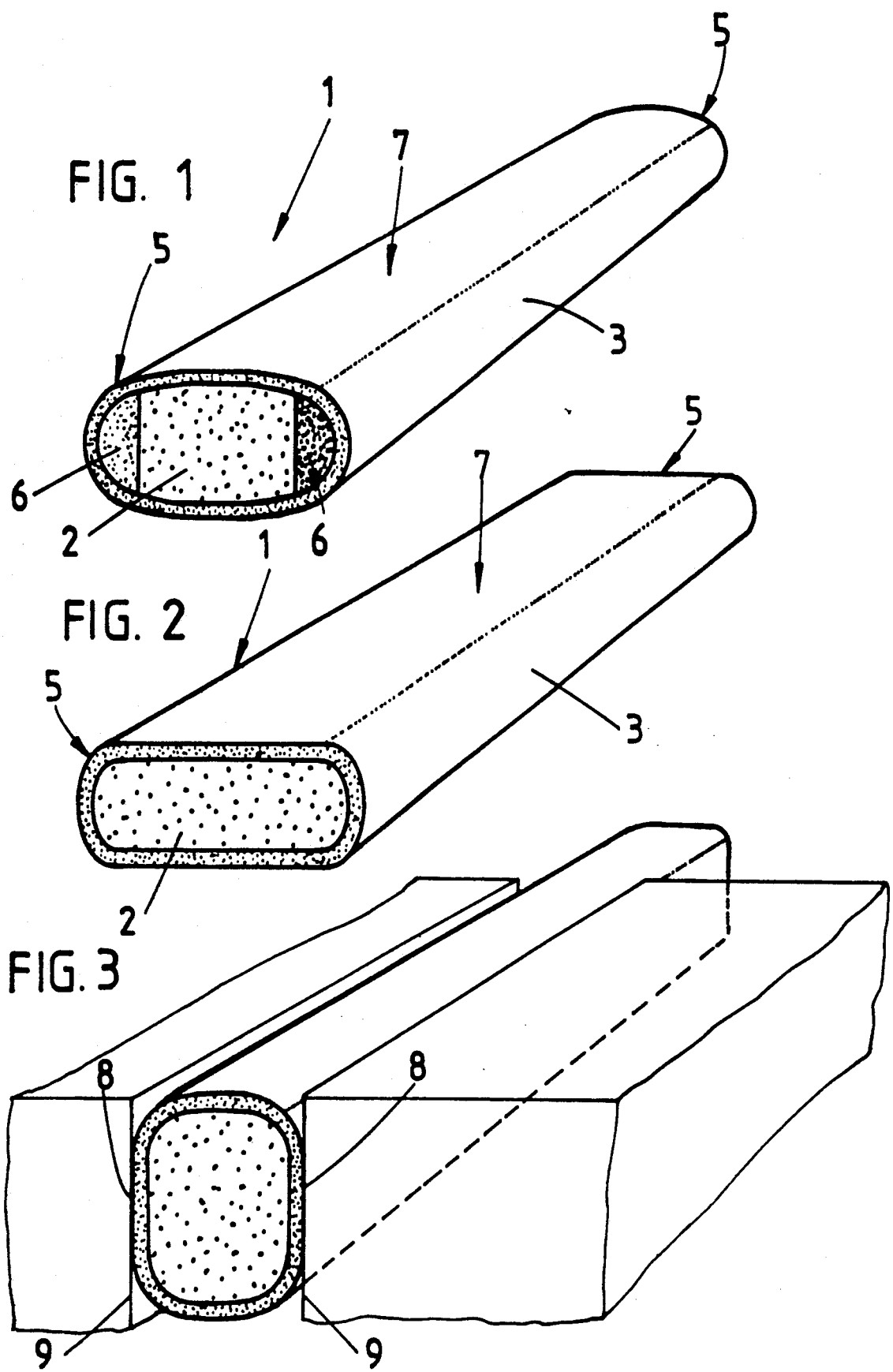

SEALING ELEMENT

RELATED APPLICATION

This application is a continuation of our co-pending application Ser. No. 07/293,516 filed Jan. 4, 1989 now abandoned.

FIELD AND BACKGROUND OF THE INVENTION

The present invention relates to a sealing element particulary for sealing joints, comprising a foam element of delayed elastic expansion as a result of impregnation, and a substantially air-tight cover.

In this known type of sealing element, however, the cover is provided merely for purposes of transportation. After pre-compression of the sealing element, the cover is evacuated and hermetically closed so that no movement of expansion can take place. Before installing the sealing element, the covering is cut open and pulled off and the known sealing element, which is capable of expansion, is inserted by itself in a sealing joint or the like. These known sealing elements, which consist of open-cell foam so as to be permeable, are, however, not tight in the desired manner for all purposes of use.

It is an object of the invention to so develop the known sealing element that, while still having the known advantageous possibilities of use, an improved seal results.

SUMMARY OF THE INVENTION

According to the invention the cover (3) defines an opening region (5) within which the foam element (2) is exposed.

In accordance with the invention, the cover known per se transportation purposes is provided with an opening, it then being possible to introduce the sealing element together with the cover into a joint or the like. The opening makes possible expansion of the foam element together with the cover surrounding it. Yet a surprisingly good seal with advantageous properties of installation results. The sealing element of the invention can be introduced, like any other known sealing elements of impregnated foam of delayed expandability, in compressed condition (e.g. held in such condition by hoops or straps as in U.S. Pat. No. 4,621,731) into a sealing gap in which it then expands (e.g. after the hoops or straps are released) and in its expanded condition performs the sealing function. As a result of the cover, depending on the opening, the invention also has the surprising property that the expansion takes place with substantial delay. The open-cell foam draws in air to fill its pores upon its expansion, the air being able, with the sealing element of the invention, to enter solely through the region of the opening in the cover.

In an embodiment of the invention it is provided that the cover be formed of a plastic foil, for instance, one having a base of polyethylene. The cover may also consist of, for instance, a plasticized PVC foil. It is also particularly preferred for the cover to consist of a shrinkable PVC foil which can, for instance, be shrunk onto the foam element. For manufacture one can also proceed in the manner that the cover is longitudinally heat-sealed after application onto the foam element. It is also particularly preferred for the cover to consist of a closed-cell foam material. In such case, the region of application of the sealing element is formed in known advantageous fashion, of foam which can compensate by deformation for unevennesses or the like. The closed-cell foam of the cover is, however, substantially air-tight, so that here also there is the advantage of the sealing element having greater tightness.

Another special feature concerns the shaping of the foam element. By a shaping in which the foam element—in its unexpanded state—fills a smaller cross-section than the cover, the result can be obtained that, starting from the opening, a free space extends through the sealing element over which air can flow unimpeded upon the expansion of the foam element. With a complete covering of the entire foam element with the exception of the opening, the expansion can take place with practically the same time delay as in the case of sealing elements of impregnated open-cell foam without a cover.

It is preferred in this connection that the foam element be of approximately rectangular cross-section. The cross-sectional shape of the cover is in this case initially of minor importance. Even if the cover, for instance, in its uninfluenced (unexpanded) condition has a rectangular cross-section, lateral free spaces exist in the compressed state along the foam element through which air can penetrate into the inside of the sealing element. However, it is particularly preferred that the uninfluenced (unexpanded) cross-sections of the foam element and of the cover be different. For example, the cover in its uninfluenced condition can have a circular cross-section and the foam element, on the other hand, a rectangular cross-section. With this latter development there is also the advantage of a particularly high pressure per unit area in the expanded state.

The shaping of the foam element and of the cover can, in particular, be such that in the compressed state (held e.g. by expansion retraints before they are released to permit expansion of the foam element) a free space is present between the cover and the foam element while in the installed, expanded state of the sealing element the foam element rests practically completely against the inner surface of the cover. As a result of the free space there is practically an unimpeded capability of expansion of the foam element. In the expanded state, on the other hand, exposure of the inner foam element is still present only in the regions of the openings of the cover.

Furthermore, it is preferred that, with such a sealing element, less pre-compression of the foam of delayed expansion is required than in the case of known sealing elements which consist merely of impregnated open-cell foam, which therefore expands with delay. A pre-compressing to about 50% is effected.

BRIEF DESCRIPTION OF THE DRAWINGS

With the above and other objects and advantages in view, the present invention will become more clearly understood in connection with the detailed description of a preferred embodiment, when considered with the accompanying drawing, of which:

FIG. 1 is a perspective view showing a sealing element having a cover of closed-cell foam with a substantially rectangular foam element on the inside;

FIG. 2 is a perspective view showing a sealing element in accordance with FIG. 1 but pre-compressed in the direction of the wide sides of the substantially rectangular foam element; and FIG. 3 is a perspective view showing the sealing object of FIG. 1 in expanded condition.

DETAILED DESCRIPTION OF THE PREFERRED EMBODIMENTS

Figure 1A:
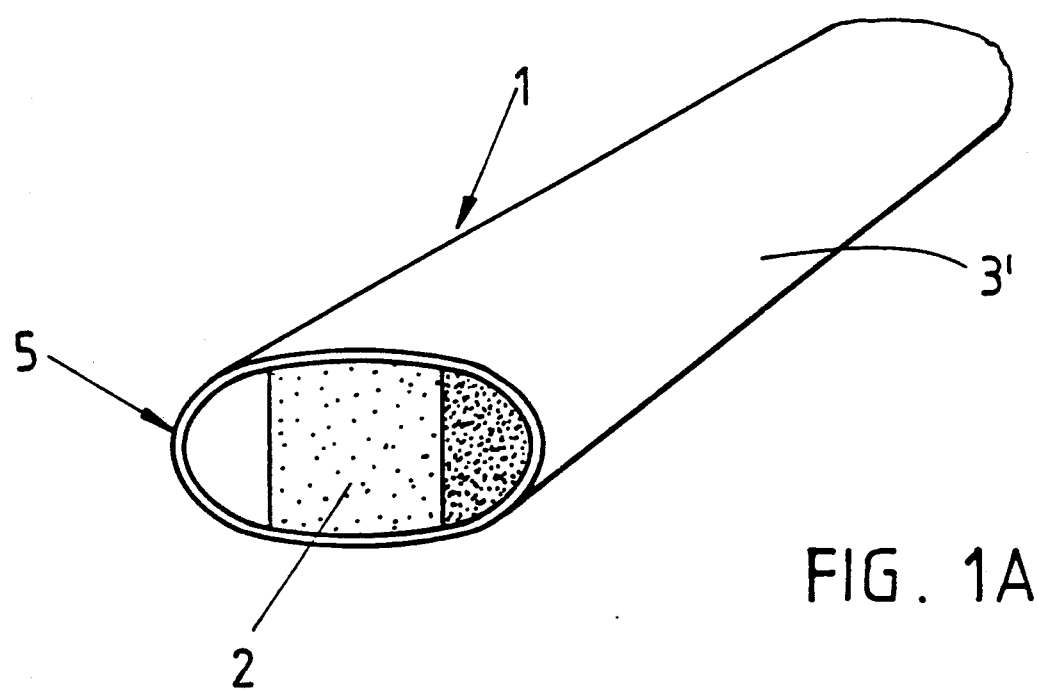
FIG. 1A is a broken away portion of a view the same as FIG. 1 but showing the cover made of a plastic foil.

There is shown and described a sealing element 1, which has an inner foam element 2, which consists of open-cell foam and is of delayed expansion as a result of its impregnation. This open-cell foam material is well known in the state of the art as well as the impregnation material which gives the open-cell foam the property of delayed expansion. The impregnation material basically is a sticky substance with adhesive action. U.S. Pat. Nos. 4,564,550, 4,401,716, 4,621,731 and 4,767,655 and the patent issuing on Ser. No. 07/275,448 represent this state of the art and are incorporated by reference herein for these materials per se. The foam element 2 is contained within a cover 3, which completely surrounds the foam element 2 over the length of the sealing element 1. Each of the ends 5 of the cover 3, however, forms an opening region 5 within which the foam element 2 is exposed.

The cover 3 in the uninfluenced condition has a substantially circular cross-section. As a result of the substantially rectangular cross-section of the foam element 2, upon compression by compressive forces compressing the sealing element in the direction of narrow sides of the foam element, as can be noted from FIG. 1, free spaces 6 result in the compressed state, said spaces extending along both surfaces of the foam element 2 over the length of the sealing element 1. As a result of these free spaces 6, the sealing element 1 can expand unimpeded with delay after release of the compressive or other forces restraining expansion and installation into a joint or the like.

In FIG. 2, the foam element 2 is pre-compressed in the direction of its wide sides such that practically no free spaces result. The expansion takes place here correspondingly slower after release of the compressive or other forces restraining expansion.

The cover 3 is formed of a strip material which is heatsealed longitudinally. The weld seam is indicated by the reference number 7 in FIG. 1. The cover 3' may be a plastic foil (FIG. 1A).

FIG. 3 shows the sealing element of FIG. 1 in expanded state, inserted in a joint. As can be noted, in the expanded state, there are two application regions 8 against the limiting walls 9 of a joint or the like. As a result of the substantially rectangular shape of the foam element 2 shown in the example, a relatively high pressure per unit surface area is also obtained and thus a high degree of sealing at the application regions 8. Since the cover 3 consists of a jacket of closed-cell foam, the joint is closed with a high degree of sealing. It can be seen that in the expanded state, in FIG. 3, the foam element 2 rests against the inner surface of the cover 3, while in compressed state (see FIG. 1), the aforementioned free spaces 6 are formed.

We claim:

1. An expandable sealing element adapted to be held in a compressed condition and respectively to be released for expansion, comprising an impregnated foam element having delayed elastic expansion due to impregnation of the foam element with a material having adhesive action, and an expandable cover covering the foam element, and wherein the cover defines an opening region by which the foam element is exposed for entrance of air, whereby the foam element elastically expands with delay solely by the entrance of the air through the opening region into pores of the foam element, without heating being required, when released from the compressed condition.

2. The sealing element according to claim 1, wherein the cover comprises a plastic foil.

3. The sealing element according to claim 1, wherein the cover comprises a closed-cell foam material.

4. The sealing element according to claim 3, wherein said cover is almost air-tight except for said opening region.

5. The sealing element according to claim 3, wherein said impregnated foam element is made of open-cell foam which is impregnated with said material having adhesive action.

6. The sealing element according to claim 1, wherein the foam element has a substantially rectangular cross-section in its expanded state.

7. The sealing element according to claim 1, wherein the cross-sections of the foam element and of the cover in their uninfluenced states are different.

8. The sealing element according to claim 1, wherein a free space is formed between the cover and the foam element in compressed state of the foam element, and the foam element rests substantially completely against an inner surface of the cover in an installed, expanded state of the foam element.

9. The sealing element according to claim 1, wherein said cover forms a tube having ends with said opening region at said ends of the tube.

10. The sealing element according to claim 9, wherein a free space is formed between the cover and the foam element in compressed state of the foam element, and said free space extends along and between said tube and said foam element.

11. The sealing element according to claim 1, wherein said cover is air-tight except for said opening region.

12. The sealing element according to claim 1, wherein said cover is almost air-tight except for said opening region.

13. The sealing element according to claim 12, wherein said impregnated foam element is made of open-cell foam which is impregnated with said material having adhesive action.

14. The sealing element according to claim 1, wherein said impregnated foam element is made of open-cell foam which is impregnated with said material having adhesive action.

15. The sealing element according to claim 1, wherein said cover completely covers said impregnated foam element except for said opening region and is expanded by the expanding foam element after its release from the compressed condition and adapted to engage a member to be sealed by tight sealing.

* * * * *